US007041772B2

(12) United States Patent
Aizawa et al.

(10) Patent No.: US 7,041,772 B2
(45) Date of Patent: May 9, 2006

(54) METHOD FOR PRODUCING BENZOXAZINE RESIN

(75) Inventors: Teruki Aizawa, Utsunomiya (JP); Yasuyuki Hirai, Oyama (JP); Syunichi Numata, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 2 days.

(21) Appl. No.: 10/471,204

(22) PCT Filed: Mar. 12, 2002

(86) PCT No.: PCT/JP02/02279

§ 371 (c)(1),
(2), (4) Date: Sep. 10, 2003

(87) PCT Pub. No.: WO02/072655

PCT Pub. Date: Sep. 19, 2002

(65) Prior Publication Data

US 2004/0138345 A1  Jul. 15, 2004

(30) Foreign Application Priority Data

Mar. 12, 2001  (JP) .............................. 2001-068793

(51) Int. Cl.
*C08G 14/04* (2006.01)
(52) U.S. Cl. ...................... 528/129; 528/137; 528/145; 528/422; 528/491; 528/493; 528/495; 528/501; 528/503
(58) Field of Classification Search ................ 528/129, 528/137, 145, 422, 491, 495, 493, 501, 503
See application file for complete search history.

(56) References Cited

U.S. PATENT DOCUMENTS 4,501,864 A    2/1985  Higginbottom
5,910,521 A    6/1999  Johnson et al.

FOREIGN PATENT DOCUMENTS

| JP | 9-20816      | 1/1997  |
|----|--------------|---------|
| JP | 11-80299     | 3/1999  |
| JP | 11-106465    | 4/1999  |
| JP | 11-209453    | 8/1999  |
| JP | 2000-154225  | 6/2000  |
| WO | WO 00/61650  | 10/2000 |
| WO | WO 01/34581  | 5/2001  |

OTHER PUBLICATIONS

Communication and Supplementary European Search Report mailed Aug. 20, 2004 in No. EP 02 70 3968.
Ning, et al., "Phenolic Materials via Ring-Opening Polymerization: Synthesis and Characterization of Bisphenol-A Based Benzoxazines and Their Polymers", Journal of Polymer Science: Part A: Polymer Chemistry, 1994, vol. 32, pp. 1121-1129.

*Primary Examiner*—Duc Truong
(74) *Attorney, Agent, or Firm*—Antonelli, Terry, Stout and Kraus, LLP.

(57) ABSTRACT

The present invention discloses a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure, wherein a pressure in the reaction system at the time of removal is set to 260 mmHg or higher.

8 Claims, No Drawings

METHOD FOR PRODUCING BENZOXAZINE RESIN

TECHNICAL FIELD

This invention relates to a process for producing a benzoxazine resin having an oxazine ring.

BACKGROUND ART

Syntheses of a benzoxazine resin have been reported in Journal of Organic Chemistry (J. Org. Chem), vol. 30, p. 3423 (1965) (author; Burke), Japanese Provisional Patent Publications No. 155234/1985, No. 177074/1985 and No. 47378/1974, and Journal of Polymer Science Part A: Polymer Chemistry (J. Polym. Sci. Part A: Polym. Chem.), vol. 32, p. 1121 (1994) (authors; Ishida et al.). According to these reports, as a synthesis method of a benzoxazine resin, there are disclosed that (1) a method in which formaldehyde is added to a mixed solution of a compound having a phenolic hydroxyl group and a primary amine, (2) a method in which a phenolic hydroxyl group is added to a solution obtained by reacting a primary amine with formaldehyde and (3) a method in which it is synthesized by a method of adding a mixture of a primary amine and a phenolic hydroxyl group to formaldehyde, and then, removing a reaction solvent and condensation water produced at the time of synthesis under a reduced pressure.

When the formed condensation water and the reaction solvent are removed under a significantly reduced pressure from the start, the temperature of a reaction solution abruptly drops due to heat deprived by volatilization of the water and reaction solvent, whereby the temperature of the reaction solution becomes much lower than the softening point of a synthesized resin. In this case, since a benzoxazine resin has neither water solubility nor hydrophilicity, the viscosity of the reaction solution increases, so that stirring of the reaction solution becomes impossible and it takes enormous efforts to discard it.

The present invention has been done to solve these problems. A first object of the present invention is to produce a benzoxazine resin safely. Also, a second object of the present invention is to remove generated condensation water and an organic solvent with good efficiency. Moreover, a third object of the present invention is to adjust the molecular weight of an obtained benzoxazine resin with good efficiency.

As a result of earnest studies and developments by the present inventors, these problems of the present invention have been overcome based on the novel findings mentioned below.

DISCLOSURE OF THE INVENTION

The present invention relates to the following contents.
(1) A process for producing a benzoxazine resin comprising the steps of reacting a phenol compound, an aldehyde compound and a primary amine in the presence of an organic solvent to synthesize a benzoxazine resin and removing generated condensation water and the organic solvent from a reaction system under heating and a reduced pressure, wherein a pressure in the reaction system at the time of removal is set to 260 mmHg or higher.
(2) The process of the above (1), wherein the pressure in the reaction system is set to less than 260 mmHg at the time that the temperature of a reaction mixture exceeds a minimal point and is higher than a temperature which is 10° C. lower than the softening point of the benzoxazine resin to be obtained, during removal of the produced condensation water and the organic solvent from the reaction system under a pressure of the reaction system being set to 260 mmHg or higher.
(3) The process of the above (1) or (2), wherein an adjustment of a molecular weight is carried out by heating a reaction mixture at 100° C. to lower than 130° C. after predetermined amounts of the generated condensation water and the organic solvent have been removed.
(4) The process of any of the above (1) to (3), wherein the organic solvent is an organic solvent which has affinity to water.
(5) The process of the above (4), wherein the organic solvent is an organic solvent having an azeotropic temperature with water of 60 to 100° C.

BEST MODE FOR CARRYING OUT THE INVENTION

In the present invention, a reaction of a phenol compound, an aldehyde compound and a primary amine is carried out in accordance with the following reaction formula.

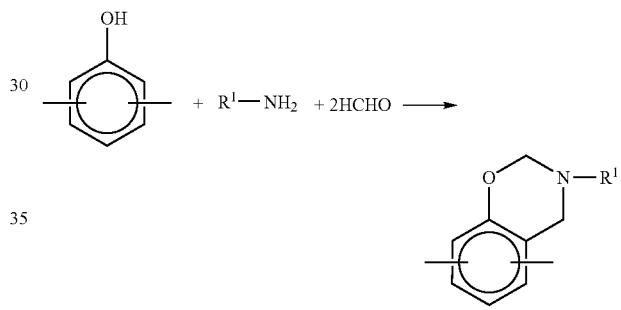

wherein $R^1$ is a residue in which an amino group has been removed from a primary amine.

A phenol compound to be used in the present invention is a compound having a phenolic hydroxyl group in which hydrogen is bonded to at least one of ortho positions of the hydroxyl group. For example, there may be mentioned a monofunctional phenol compound such as phenol, cresol and xylenol, a bifunctional phenol compound such as biphenol, bisphenol A, bisphenol F and bisphenol S, and a polyfunctional phenol compound such as a trisphenol compound, a phenol-novolac resin, a styrene-phenol copolymer, a xylene-modified phenol resin, a melamine-modified phenol resin, a xylylene-modified phenol resin and a biphenylene-modified phenol resin.

As an aldehyde compound to be used in the present invention, there may be mentioned, for example, formaldehyde, an aromatic aldehyde compound such as benzaldehyde, and a mixture thereof. As the aldehyde compound, formaldehyde is preferred. Formaldehyde may be used in the form of formalin or paraformaldehyde.

As a primary amine to be used in the present invention, there may be mentioned, for example, an aliphatic amine such as methylamine, ethylamine and propylamine, and an aromatic amine such as aniline, toluidine, anisidine, p-phenylenediamine, diaminodiphenylmethane and diaminodiphenyl ether. In the present invention, aniline is particularly preferably used among these materials.

To synthesize a benzoxazine resin, it is desirable to carry out the reaction of the phenol compound, primary amine and aldehyde compound preferably by using 0.5 to 1.2 mols, more preferably 0.75 to 1.1 mols of the primary amine per mol of a phenolic hydroxyl group of the phenol compound, and preferably 1.7 to 2.3 mols, more preferably 1.8 to 2.2 mols of the aldehyde compound per mol of the primary amine. Since the primary amine is liable to evaporate during the reaction, attention must be paid to reduction in the amount of the primary amine in a reaction system. Further, when a reaction amount of the primary amine becomes small, part of phenolic hydroxyl groups of the phenol compound remains unreacted, so that such properties as curability and mechanical strength can be easily improved. When the formulation amount of the primary amine is set as mentioned above, adjustment and control of these properties can be carried out easily. The same as above can be applied also to the aldehyde compound.

As an organic solvent to be used in the present invention, there may be mentioned, for example, an alcohol type solvent such as methanol and ethanol, a ketone type solvent such as acetone, methyl ethyl ketone and methyl isobutyl ketone, an ethylene glycol type solvent such as ethylene glycol monomethyl ether and an aromatic type solvent such as toluene. Of these, an organic solvent having an affinity to water such as an alcohol type solvent, ketone type solvent and ethylene glycol type solvent is preferably used. Here, the terms of having an affinity to water mean an organic solvent which forms a uniform solution when mixed with water in a ratio (weight ratio) of the organic solvent to water of 9:1. Further, an organic solvent having an azeotropic temperature with water of 60° C. or higher to 100° C. or lower is preferably used. Of these organic solvents having an affinity to water, methanol and methyl ethyl ketone are suitable since they are inexpensive and have an azeotropic temperature with water within the preferred range as a reaction temperature. The organic solvent is preferably used in an amount of 25 to 80% by weight based on the sum of the charged amount of raw materials to be reacted. If the amount of the organic solvent is too small, the viscosity of a reaction solution increases, thereby increasing stirring stress, while if it is too large, it takes extra energy and time for removal after the reaction.

A benzoxazine resin can be produced by the following manner.

Raw materials may be mixed into a reaction solvent in an appropriate order. Since the reaction is an exothermic reaction, attention must be paid to an abrupt increase in temperature. Preferably, after a phenol compound is dissolved in an organic solvent, an aldehyde compound is added to the mixture, the resulting mixture is stirred well, and then, a primary amine or a solution obtained by dissolving a primary amine into an organic solvent is added dropwise to the stirred mixture in dividing into several times or continuously. The speed of dropping is a speed such that bumping does not occur. Further, when the reaction is carried out under reflux, reaction temperature conditions can be stabilized with ease.

A reaction temperature is preferably 60° C. or higher, and it is preferred to carry out at the reflux temperature of the solvent(s). Completion of the reaction can be confirmed by the residual amount of unreacted raw materials. For example, the reaction is considered to be completed when 99% or more of a theoretical reaction amount of a primary amine when it is reacted completely is reacted.

After the reaction had been completed, condensation water generated at the time of synthesis and the organic solvent are removed, i.e., concentration under a reduced pressure is carried out, whereby a benzoxazine resin can be obtained.

The concentration under a reduced pressure is carried out under heating. The pressure of the reaction system is set to be 260 mmHg or higher. When the reducing degree of pressure is too high, the temperature of the reaction solution abruptly drops and becomes much lower than the softening point of a benzoxazine type resin to be obtained. Also, since a benzoxazine type resin is not dissolved in water easily and a large amount of water remains in the reaction solution at this time, the viscosity of the reaction solution becomes too high, whereby the reaction solution is liable to become impossible to stir. When the reducing degree of pressure is too low, it takes too much time to remove the condensation water and the organic solvent. A benzoxazine type resin obtained by the reaction has self-curability. Thus, to prevent the softening point or molecular weight of the benzoxazine type resin obtained by the reaction from changing due to the progress of self-curing of the benzoxazine type resin, the temperature of the reaction solution being concentrated under a reduced pressure is particularly preferably not higher than 100° C.

In the present specification, the softening point of a benzoxazine resin obtained at the time that the condensation water and the organic solvent are removed completely (or when no solution is flown out) is referred to as "the softening point of the benzoxazine resin".

When the condensation water and the organic solvent are removed under the above conditions, the reaction solution does not become impossible to stir, and a benzoxazine type resin can be produced safely. However, since the reducing degree of pressure is low, it takes much time to produce the benzoxazine type resin. To improve this, it is preferred that the pressure of the reaction system be adjusted to less than 260 mmHg at a point when removal of the condensation water and the organic solvent proceeded to a certain degree.

As described above, at the time of starting removal of the condensation water and the organic solvent, the temperature of the reaction solution lowers once, and as the removal of the condensation water and the organic solvent proceeds, the temperature of the reaction solution increases. That is, a minimal point (R) exists in the relationship between time (horizontal axis) and the temperature (vertical axis) of the reaction solution. This minimal point is often equal to or lower than the softening point (S) of a benzoxazine resin.

With regard to a time period at which a reducing degree of pressure is made large, if it is adjusted too early, the bumping of the reaction solution occurs and the temperature of the reaction solution becomes too low. Therefore, it is preferred that the pressure of the reaction system be set to a reduced pressure less than 260 mmHg when the temperature (A) of the reaction solution has reached a temperature higher than the temperature 10° C. lower than the softening point (S) of a benzoxazine resin, more preferably 5° C. [at (S−10)° C., more preferably at (S−5)° C.], and after passing the above minimal point (R). The time period at which the pressure of the reaction system is set to less than 260 mmHg may be anytime as long as the above conditions are satisfied. However, the setting is preferably made at the point that the above conditions are satisfied or within a time period not so late from the point that the above conditions are satisfied. Although an absolute pressure of the reaction system at the time of concentration under reduced pressure may be as low as possible, the pressure of the reaction system is preferably set to less than 160 mmHg from the viewpoint of operation efficiency or the like.

The softening point (S) of a benzoxazine resin produced by the process of the above (1) is almost the same as that of a benzoxazine resin produced by the process of the above (2).

After the concentration under a reduced pressure, the viscosity, i.e., molecular weight of a benzoxazine resin can be controlled by use of the self-curability of the resin. To do so, the benzoxazine resin is heat-treated at a heating temperature of preferably 100° C. to lower than 130° C., more preferably 100 to 125° C. If the heating temperature is lower than 100° C., increase in the viscosity becomes slow, while if the heating temperature is 130° C. or higher, reactivity is so high that the viscosity becomes difficult to control. In particular, when the benzoxazine resin is used in a laminated plate, the melt viscosity at 125° C. of the benzoxazine resin is particularly preferably adjusted to be within a range of 3 to 10 poises.

EXAMPLES

In the following, the present invention will be described in more detail with reference to Examples.

Example 1

Into a 5-liter flask equipped with a thermometer, stirrer, cooling tube and dropping device were charged 1040 g of a phenol-novolac resin having a number average molecular weight (measured by use of a calibration curve of a standard polystyrene in accordance with a gel permeation chromatography method) of 400 and 560 g of methyl ethyl ketone, and the mixture was dissolved by stirring. Then, 600 g of paraformaldehyde was added to the mixture. Under stirring, 931 g of aniline was added dropwise to the mixture over one hour. The temperature of the reaction solution at this time was 81° C. Thereafter, the reaction solution was allowed to react for 7 hours under reflux (80 to 82° C.). Subsequently, the reaction mixture was started to undergo concentration under a reduced degree of the pressure at 360 mmHg under heating. The concentration was continued while keeping this reduced degree of the pressure, and, at the time when the temperature of the reaction mixture reached 110° C., the reduced degree of the pressure was raised to 90 mmHg. After confirming the absence of effluent (the melting temperature of the resin at this time was 120° C.), the resin was taken out and placed in a tray. The softening point of the resin was 115° C., and its melt viscosity was 40 poise or higher at 150° C. Incidentally, the temperature of the reaction solution at the minimal point (R) was 52° C.

Example 2

Into a 5-liter flask equipped with a thermometer, stirrer, cooling tube and dropping device were charged 1140 g of bisphenol A and 900 g of methyl ethyl ketone, and the mixture was dissolved by stirring. Then, 1622 g of a 37% formalin solution was added to the mixture. Under stirring, 931 g of aniline was added dropwise to the mixture over one hour. The temperature of the reaction solution at this time was 81° C. Thereafter, the reaction solution was allowed to react for 7 hours under reflux (80 to 82° C.). Subsequently, the reaction mixture was started to undergo concentration under a reduced degree of the pressure at 360 mmHg under heating. The concentration was continued while keeping this reduced degree of the pressure, and, at the time when the temperature of the reaction mixture reached 85° C., the reduced degree of the pressure was raised to 90 mmHg. After confirming the absence of effluent (the melting temperature of the resin at this time was 100° C.), the resin was taken out and placed in a tray.

The softening point of the obtained resin was 75° C., and its melt viscosity was 2.5 poise (125° C.). The temperature of the reaction solution at the minimal point (R) was 67° C.

Example 3

Into a 5-liter flask equipped with a thermometer, stirrer, cooling tube and dropping device were charged 1140 g of bisphenol A and 920 g of methanol, and the mixture was dissolved by stirring. To the mixture was added 652 g of paraformaldehyde. Under stirring, 930 g of aniline was added dropwise to the mixture over one hour. The temperature of the reaction solution at this time was 79° C. Thereafter, the reaction solution was allowed to react for 7 hours under reflux (78 to 80° C.). Subsequently, the reaction mixture was started to undergo concentration under a reduced degree of the pressure at 360 mmHg under heating. The concentration was continued while keeping this reduced degree of the pressure, and, at the time when the temperature of the reaction mixture reached 85° C., the reduced degree of the pressure was raised to 90 mmHg. After confirming the absence of effluent (the melting temperature of the resin at this time was 100° C.), the resin was taken out and placed in a tray. The softening point of the resin was 76° C., and its melt viscosity was 2.7 poise (125° C.). The temperature of the reaction solution at the minimal point (R) was 70° C.

Example 4

Into a 5-liter flask equipped with a thermometer, stirrer, cooling tube and dropping device were charged 1000 g of bisphenol F and 920 g of methanol, and the mixture was dissolved by stirring. Then, 652 g of paraformaldehyde was added thereto. Then, 930 g of aniline was added dropwise over one hour under heating. The temperature of the reaction solution at this time was 79° C. Thereafter, the reaction solution was allowed to react for 7 hours under reflux (78 to 80° C.). Subsequently, the reaction mixture was started to undergo concentration under a reduced degree of the pressure at 360 mmHg under heating. The concentration was continued while keeping this reduced degree of the pressure, and, at the time when the temperature of the reaction solution reached 90° C., the reduced degree of the pressure was raised to 90 mmHg. After confirming the absence of effluent (the melting temperature of the resin at this time was 100° C.), the resin was taken out and placed in a tray. The softening point of the resin was 78° C., and its melt viscosity was 3.0 poise (125° C.). The temperature of the reaction solution at the minimal point (R) was 72° C.

Example 5

A resin was synthesized and concentrated under a reduced pressure according to the process of Example 3. Thereafter, the internal pressure of a flask was returned to normal pressure. The melt viscosity of the resin at this time was 2.7 poise/125° C. Subsequently, the resin was heated at 100° C. for 3 hours and then cooled. The melt viscosity of the resulting resin was 4.0 poise/125° C.

Example 6

A resin was synthesized and concentrated under a reduced pressure according to the process of Example 3. Thereafter, the internal pressure of a flask was returned to normal pressure. The melt viscosity of the resin at this time was 2.7 poise/125° C. Subsequently, the resin was heated at 110° C. for one hour and then cooled. The melt viscosity of the resulting resin was 4.0 poise/125° C.

Example 7

In the same manner as in Example 1 except for changing the pressure at the time of concentration under reduced pressure to 280 mmHg, synthesis of a resin and concentration under reduced pressure were carried out. Thereafter, the internal pressure of a flask was returned to normal pressure. The physical properties of the resin at this time were the same as in those of Example 1. Incidentally, the temperature of the reaction solution at the minimal point (R) was 50° C.

Comparative Example 1

Into a 5-liter flask equipped with a thermometer, stirrer, cooling tube and dropping device were charged 1040 g of a phenol-novolac resin having a number average molecular weight of 400 and 560 g of methyl ethyl ketone, and the mixture was dissolved by stirring. To the mixture was added 1622 g of a 37% formalin solution. Under stirring, 931 g of aniline was added dropwise to the mixture over one hour. The temperature of the reaction solution at this time was 81° C. Then, the reaction solution was allowed to react for 7 hours under reflux (80 to 82° C.). Thereafter, the reaction mixture was started to undergo concentration under a reduced degree of the pressure at 210 mmHg under heating. The viscosity of the reaction mixture increased during reducing pressure, and eventually the reaction mixture became impossible to stir.

Comparative Example 2

Into a 5-liter flask equipped with a thermometer, stirrer, cooling tube and dropping device were charged 1140 g of bisphenol A and 900 g of methyl ethyl ketone, and the mixture was dissolved by stirring. To the mixture was added 1622 g of a 37% formalin solution. Under stirring, 931 g of aniline was added dropwise to the mixture over one hour. The temperature of the reaction solution at this time was 81° C. Then, the reaction solution was allowed to react for 7 hours under reflux (80 to 82° C.). Thereafter, the reaction mixture was started to undergo concentration under a reduced degree of the pressure at 210 mmHg under heating. The viscosity of the reaction mixture increased during reducing pressure, and eventually the reaction mixture became impossible to stir.

Comparative Example 3

A resin was synthesized and concentrated under a reduced pressure according to the process of Example 3. Thereafter, the internal pressure of a flask was returned to normal pressure. The melt viscosity of the resin at this time was 3.0 poise/125° C. Subsequently, the resin was heated at 80° C. for 10 hours. The melt viscosity of the resulting resin was 4.0 poise/125° C.

Comparative Example 4

In the same manner as in Example 1 except for changing the pressure at the time of concentration under a reduced pressure to 240 mmHg, synthesis of a resin and concentration under a reduced pressure were carried out. However, similarly to Comparative example 1, the viscosity of the reaction mixture increased during reducing pressure, and eventually the reaction mixture became impossible to stir.

Test Example

A resin was synthesized and concentrated under a reduced pressure according to the process of Example 3. Thereafter, increases in heating temperature and melt viscosity were examined. The results are shown in Table 1.

It is understood from Table 1 that when the heating temperature is lower than 100° C., an increase in melt viscosity is slow, while when it is 130° C. or higher, an increase in melt viscosity is significantly accelerated, thereby making it difficult to control the melt viscosity.

TABLE 1

| Heat treatment temperature | Melt viscosity increased rate (/h) (Viscosity measured at 125° C.) |
|---|---|
| 80° C. | 0.1 p |
| 100° C. | 0.4 p |
| 110° C. | 2 p |
| 120° C. | 7 p |
| 130° C. | 24 p |

UTILIZABILITY IN INDUSTRY

According to the present invention, a benzoxazine resin can be produced safely and easily without any problems during the production of the resin. Also, according to the present invention, a benzoxazine resin can be produced efficiently, and the molecular weight of the resin can be controlled accurately by means of heat treatment carried out after completion of the reaction.

What is claimed is:

1. A process for producing a benzoxazine resin comprising the steps of reacting a phenol compound, an aldehyde compound and a primary amine in the presence of an organic solvent to synthesize a benzoxazine resin and removing generated condensation water and the organic solvent from a reaction system under heating and a reduced pressure,
    wherein a pressure in the reaction system at the time of removal is set to 260 mmHg or higher, and
    wherein the pressure in the reaction system is set to less than 260 mmHg at the time that the temperature of a reaction mixture exceeds a minimal point and is higher than a temperature which is 10° C. lower than the softening point of the benzoxazine resin to be obtained, during removal of the produced condensation water and the organic solvent from the reaction system under a pressure of the reaction system being set to 260 mmHg or higher.

2. The process according to claim 1, wherein an adjustment of a molecular weight is carried out by heating a reaction mixture at 100° C. to lower than 130° C. after predetermined amounts of the generated condensation water and the organic solvent have been removed.

3. The process according to claim 1, wherein the organic solvent is an organic solvent which has affinity to water.

4. The process according to claim 3, wherein the organic solvent is an organic solvent having an azeotropic temperature with water of 60 to 100° C.

5. The process according to claim 3, wherein an adjustment of a molecular weight is carried out by heating a reaction mixture at 100° C. to lower than 130° C. after predetermined amounts of the generated condensation water and the organic solvent have been removed.

6. The process according to claim 5, wherein the organic solvent is an organic solvent having an azeotropic temperature with water of 60 to 100° C.

7. The process according to claim 1, wherein the organic solvent is selected from the group consisting of methanol and methyl ethyl ketone.

8. The process according to claim 1, wherein the reaction system is heated to a temperature not higher than 100° C. during said removing generated condensation water and the organic solvent.

* * * * *